(12) United States Patent
Manikas et al.

(10) Patent No.: US 11,965,479 B2
(45) Date of Patent: Apr. 23, 2024

(54) SYSTEM AND METHOD FOR REPAIRING A GEARBOX OF A WIND TURBINE UPTOWER

(71) Applicant: General Electric Company, Schenectady, NY (US)

(72) Inventors: Brian William Manikas, Schenectady, NY (US); Paul Howard Davidson, Albany, NY (US); Michael Frederick Sander, Colonie, NY (US); Jacob Thomas Hoyt, Cazenovia, NY (US); Jason James Welsh, Madison, WI (US); Kevin L Holmes, Portageville, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 502 days.

(21) Appl. No.: 17/204,780

(22) Filed: Mar. 17, 2021

(65) Prior Publication Data

US 2021/0222680 A1    Jul. 22, 2021

Related U.S. Application Data

(62) Division of application No. 16/395,849, filed on Apr. 26, 2019, now Pat. No. 10,982,655.

(51) Int. Cl.
*F03D 80/50* (2016.01)
*B23P 6/00* (2006.01)
(Continued)

(52) U.S. Cl.
CPC ............... *F03D 15/10* (2016.05); *B23P 6/00* (2013.01); *B23P 6/002* (2013.01); *F03D 80/50* (2016.05);
(Continued)

(58) Field of Classification Search
CPC .......... F03D 15/10; F03D 80/50; F03D 15/00; B23P 6/00; B23P 6/002; F16H 57/021;
(Continued)

(56) References Cited

U.S. PATENT DOCUMENTS

2006/0148612 A1   7/2006 Albers et al.
2012/0141292 A1   6/2012 Signore et al.
(Continued)

FOREIGN PATENT DOCUMENTS

CN    108105041         6/2018
CN    108105041 A  *   6/2018   ............. F03D 15/00
(Continued)

OTHER PUBLICATIONS

Cai H; CN-108105041-A Machine Translation (Year: 2018).*
European Search Report Corresponding to EP20170885.6 dated Sep. 4, 2020.

*Primary Examiner* — Lee A Holly
(74) *Attorney, Agent, or Firm* — Dority & Manning, P.A.

(57) ABSTRACT

A rotor lock assembly for locking a rotor of a wind turbine. The rotor lock assembly has at least one relocatable rotor lock. The relocatable rotor lock has a housing, a bushing element, a pin shaft position within the bushing element, and a locking mechanism. The housing includes a mounting portion adapted for mounting to a bearing housing adjacent to a rotor lock plate of the rotor.

7 Claims, 7 Drawing Sheets

(51) Int. Cl.
*F03D 15/10* (2016.01)
*F16H 57/021* (2012.01)
*F16H 57/023* (2012.01)
F16H 57/00 (2012.01)
F16H 57/02 (2012.01)

(52) U.S. Cl.
CPC ........ *F16H 57/021* (2013.01); *F05B 2230/70* (2013.01); *F05B 2230/80* (2013.01); *F05B 2240/916* (2013.01); *F05B 2260/4031* (2013.01); *F16H 2057/0068* (2013.01); *F16H 2057/02078* (2013.01); *F16H 2057/0235* (2013.01); *Y10T 29/49318* (2015.01); *Y10T 29/49721* (2015.01)

(58) Field of Classification Search
CPC ... F16H 2057/0068; F16H 2057/02078; F16H 2057/0235; F05B 2230/70; F05B 2230/80; F05B 2240/916; F05B 2260/4031; F05B 2230/61; F05B 2260/30; Y10T 29/49318; Y10T 29/49721
See application file for complete search history.

(56) References Cited

U.S. PATENT DOCUMENTS

2014/0259590 A1* 9/2014 Eddy ...................... F03D 13/40
  29/402.03
2015/0086367 A1 3/2015 Holloway et al.

FOREIGN PATENT DOCUMENTS

| DE | 102015119173 | 5/2017 | |
| EP | 2146090 | 1/2010 | |
| EP | 2808288 | 12/2014 | |
| WO | WO-2008069818 A1 * | 6/2008 | ............. B66C 23/18 |

* cited by examiner

SYSTEM AND METHOD FOR REPAIRING A GEARBOX OF A WIND TURBINE UPTOWER

CROSS REFERENCE TO RELATED APPLICATIONS

This application claims priority to, and is a divisional application of, U.S. patent application Ser. No. 16/395,849 filed Apr. 26, 2019 which is incorporated by reference in its entirety herein.

FIELD

The present disclosure relates in general to wind turbines, and more particularly to systems and methods for repairing a gearbox of a wind turbine uptower.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. The main shaft is coupled to an input shaft of the gearbox, which has a higher speed output shaft connected to the generator. Thus, the geared drivetrain aims to increase the velocity of the mechanical motion. Further, the gearbox and the generator are typically supported by one or more bearings and mounted to the bedplate member via one or more torque arms or supports.

During the lifecycle of the wind turbine, it may, from time to time, be necessary to perform maintenance operations on the gearbox uptower. The maintenance operations may involve using a crane to remove a gear from the gearbox. Typically, in order to perform this operation on the gearbox, a portion of the gearbox housing must be removed. This portion of the gearbox housing typically weighs in excess of 900 kilograms (kg) and is removed with a crane. However, because the crane is needed for additional steps in the maintenance operation, there must be a place to deposit the portion of the gearbox housing so as to free the crane for additional operations. Because the operation occurs uptower, the general practice is to employ a relatively large, ground crane. Often the ground crane will have a reach in excess of 100 meters (m). Due to the footprint of the portion of the gearbox housing which is removed, there is generally inadequate space uptower to deposit the removed portion. As such, the ground crane will lower the removed portion of the gearbox housing to the ground. Relying on a relatively large, ground crane increases the cost and scheduling complexity of the maintenance operation.

In view of the aforementioned, the art is continuously seeking new and improved systems and methods for repairing a gearbox of a wind turbine without requiring the use of a relatively large, ground crane. Thus, a system and method that facilitates gearbox maintenance uptower would be advantageous.

BRIEF DESCRIPTION

Aspects and advantages of the invention will be set forth in part in the following description, or may be obvious from the description, or may be learned through practice of the invention.

In one aspect, the present disclosure is directed to a repair system for repairing a gearbox of a wind turbine uptower. The gearbox may have a gearbox housing formed, at least, of a first portion and a second portion. The repair system may include a lifting apparatus for removably coupling to the first portion of the gearbox housing of the gearbox. The lifting apparatus may be adapted for lifting the first portion of the gearbox housing relative to the second portion of the gearbox housing. The repair system may also include at least one gearbox housing support member adapted for mounting to the second portion of the gearbox housing so as to provide a support surface for the first portion of the gearbox housing during a repair procedure of the gearbox that is offset from the second portion.

In an embodiment, the repair system may also include a safety support coupled to a ring gear of the gearbox. The safety support may be oriented so as to divert the first portion of the gearbox during an unplanned descent. Additionally, in an embodiment, the safety support may also include a mounting bracket and a force arm. The mounting bracket may define a plurality of fastener openings for coupling to the ring gear. The force arm may include a first end and a second end. The first end may be adapted for perpendicularly coupling to the mounting bracket. The second end adapted for positioning below the first portion of the gearbox housing. In another embodiment, the safety support may also include a reinforcing member coupled between the force arm and the mounting bracket. The force arm may be adapted so as to impart a moment on the first portion of the gearbox housing during an unplanned descent of the first portion of the gearbox housing.

In an embodiment, the at least one gearbox housing support member may also include at least a first gearbox housing support member and a second gearbox housing support member. The first gearbox housing support member for positioning between the first portion and the second portion of the gearbox housing adjacent to a windward end of the gearbox. The second gearbox housing support member for positioning between the first portion and the second portion of the gearbox housing. In an additional embodiment, the first and second gearbox housing supports may include first and second support contact regions each defining first and second radii, respectively. The first and second radii may be adapted to receive and contact different bearings of the gearbox. The first and second gearbox housing supports may also include first and second support surfaces. In another embodiment, the first support surface may have a longitudinal axis parallel with an axial centerline of the gearbox. The second support surface may have a longitudinal axis perpendicular to an axial centerline of the gearbox.

In an additional embodiment, the repair system may also include a mechanical device for coupling between the first portion of the gearbox housing and the second portion of the gearbox housing so as to increase a downward force exerted by the first portion of the gearbox housing on the at least one gearbox housing support member. In an additional embodiment, the lifting apparatus may also include an uptower crane. The uptower crane may include a maximum dimension less than a dimension of an access hatch to the wind turbine.

In another aspect, the present disclosure is directed to a method for repairing a gearbox of a wind turbine uptower. The gearbox may include a gearbox housing with a first portion arranged atop a second portion. The method may include coupling a lifting apparatus to the first portion of the gearbox housing. The method may also include uncoupling the first portion of the gearbox housing from the second portion of the gearbox housing. Further, the method may include removing the first portion of the gearbox housing from the second portion of the gearbox housing. Additionally, the method may include mounting at least one gearbox housing support member to the second portion of the gearbox housing. The method may include lowering the first portion of the gearbox housing onto the at least one gearbox housing support member such that the first portion of the gearbox housing is supported atop the gearbox housing support member and offset from the second portion of the gearbox housing. The method may include performing a repair procedure on the gearbox and reassembling the first portion of the gearbox housing with the second portion.

In one embodiment the at least one gearbox housing support member may include, at least, a first gearbox housing support member and a second gearbox housing support member. The method may also include mounting the first gearbox housing support member to the second portion of the gearbox housing adjacent to a windward end of the gearbox. The method may further include mounting the second gearbox housing support member to the second portion of the gearbox housing between a bull gear and a planet gear of the gearbox. In an embodiment, the mounting the first gearbox support member may also include positioning a first gearbox support member radius on a first gearbox bearing so as to support the first gearbox support member. The mounting the second gearbox support member may also include positioning a second gearbox support member radius on a second gearbox bearing so as to support the second gearbox support member.

In an embodiment, the method may also include positioning a safety support below the first portion of the gearbox housing opposite the at least one gearbox housing support member as the first portion of the gearbox housing is being supported by the at least one gearbox housing support member. The method may also include coupling the safety support to a ring gear of the gearbox. In an embodiment, the method may also include securing the first portion of the gearbox housing to the at least one gearbox housing support member via one or more fasteners secured within the holes of the first portion of the gearbox housing and the at least one gearbox housing support member.

In an embodiment, the method may also include applying a downward pressure to the first portion of the gearbox housing so as to increase a downward force exerted by the first portion of the gearbox housing on the at least one gearbox housing support member. In another embodiment, the hoisting the first portion of the gearbox housing away from the second portion of the gearbox housing may also include establishing a horizontal displacement and a vertical displacement of the first portion of the gearbox housing so as to establish a gear removal path.

In an embodiment, the method may also include hoisting the at least one gearbox housing support member and the lifting apparatus of tower through an opening defined by a hatch of a nacelle of the wind turbine. In another embodiment, the method may also include hoisting the crane uptower and through the hatch and lifting, via the crane, the at least one gearbox housing support member uptower. In an additional embodiment, the method may include hoisting the crane uptower in segments and assembling the segments uptower so as to assemble the crane.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
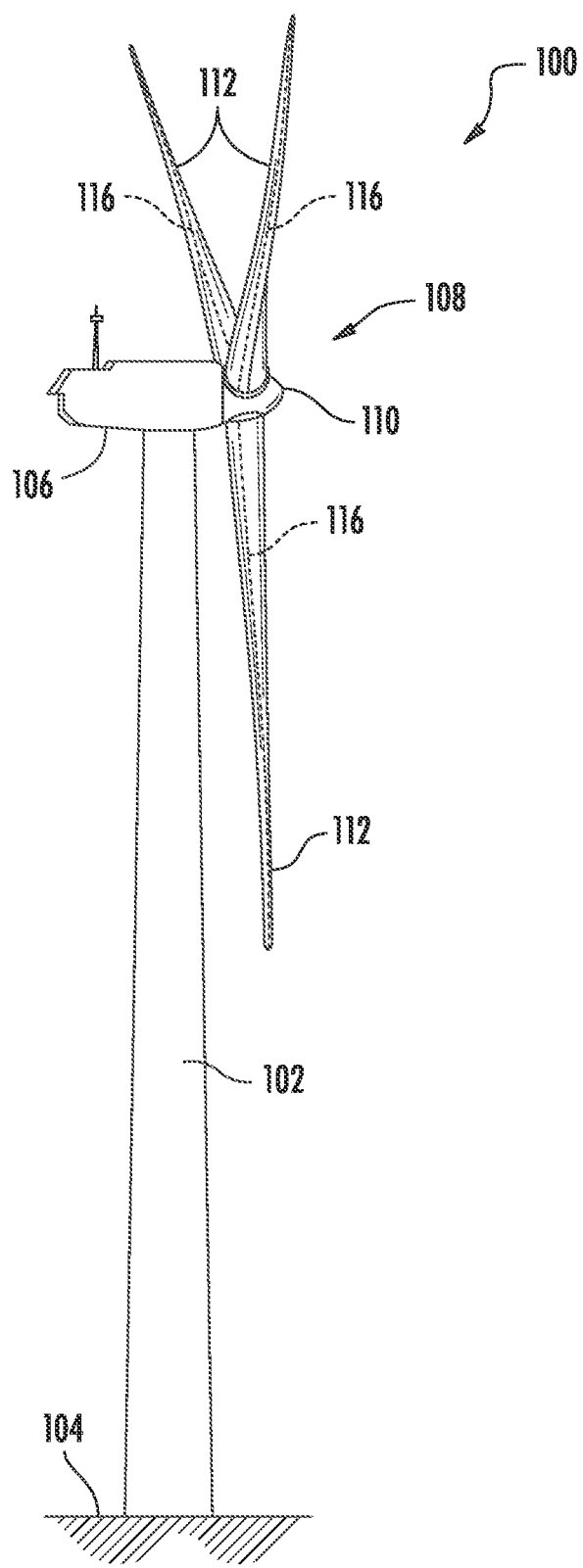
FIG. 1 illustrates a perspective view of one embodiment of a wind turbine according to aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a repair system for repairing a gearbox of a wind turbine uptower. The repair system may include a lifting apparatus, such as an uptower crane, and at least one gearbox housing support member. The uptower crane may be hoisted through an access hatch of the wind turbine and mounted on a portion of the nacelle, such as the bedplate support frame or even a torque arm of the gearbox. The uptower crane may be used to remove a first portion of the gearbox housing, such as a lid. The removal of the first portion of the gearbox housing may include lifting the first portion, shifting the first portion to a side, and causing the portion to roll so that one side of the first portion rises more than the other side of the first portion. In other words, the opening of the gearbox may more closely resemble a clamshell opening than the removal of a lid from a box.

With the first portion of the gearbox housing suspended by the uptower crane, the gearbox housing support member(s) may be inserted between the first and second portions of the gearbox housing. The gearbox housing support member(s) may be configured to be supported by a gearbox bearing and may be coupled to the second portion of the gearbox housing. The gearbox housing support member(s) may have a support surface which supports one side of the first portion of the gearbox housing, while the other side of the first portion rests on the second portion of the gearbox housing. With the gearbox housing support member(s) in place, the first portion of the gearbox housing may be secured and service operations may be safely performed on the gearbox.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, which includes an outer shell 160, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a wind turbine controller 114 centralized within the nacelle 106. However, in other embodiments, the controller 114 may be located within any other component of the wind turbine 100 or at a location outside the wind turbine. Further, the controller 114 may be communicatively coupled to any number of the components of the wind turbine 100 in order to control the components. As such, the controller 114 may include a computer or other suitable processing unit. Thus, in several embodiments, the controller 114 may include suitable computer-readable instructions that, when implemented, configure the controller 114 to perform various different functions, such as receiving, transmitting and/or executing wind turbine control signals.

Figure 2:
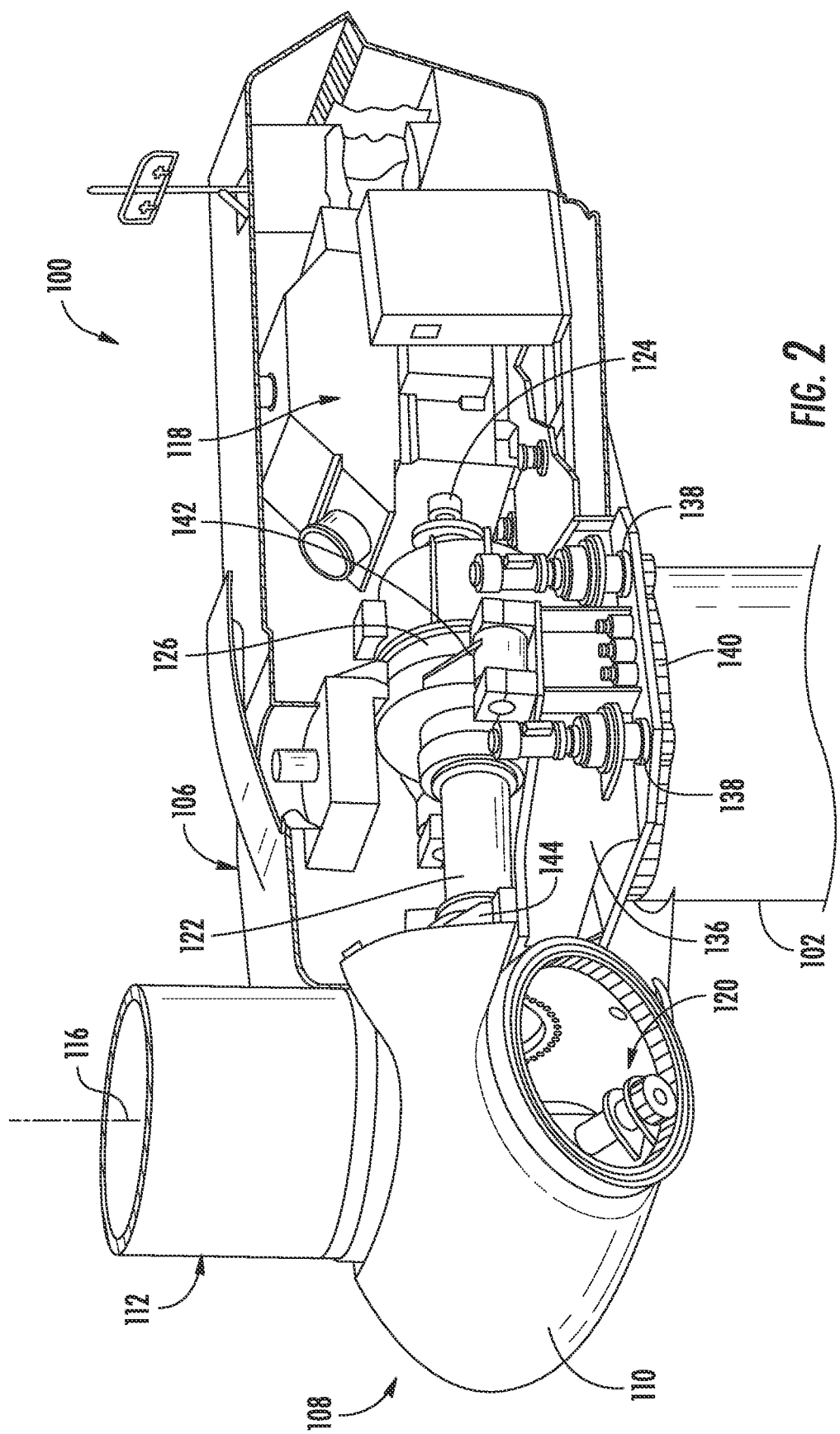
FIG. 2 illustrates a perspective view of one embodiment of a simplified, internal view of one embodiment of a nacelle of a wind turbine according to aspects of the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by one or more torque arms 142. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

Each rotor blade 112 may also include a pitch adjustment mechanism 120 configured to rotate each rotor blade 112 about its pitch axis 116. Further, each pitch adjustment mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade 112 about the pitch axis 116. Similarly, the wind turbine 100 may include one or more yaw drive mechanisms 138 communicatively coupled to the controller 114, with each yaw drive mechanism(s) 138 being configured to change the angle of the nacelle 106 relative to the wind (e.g., by engaging a yaw bearing 140 of the wind turbine 100).

Figure 3:
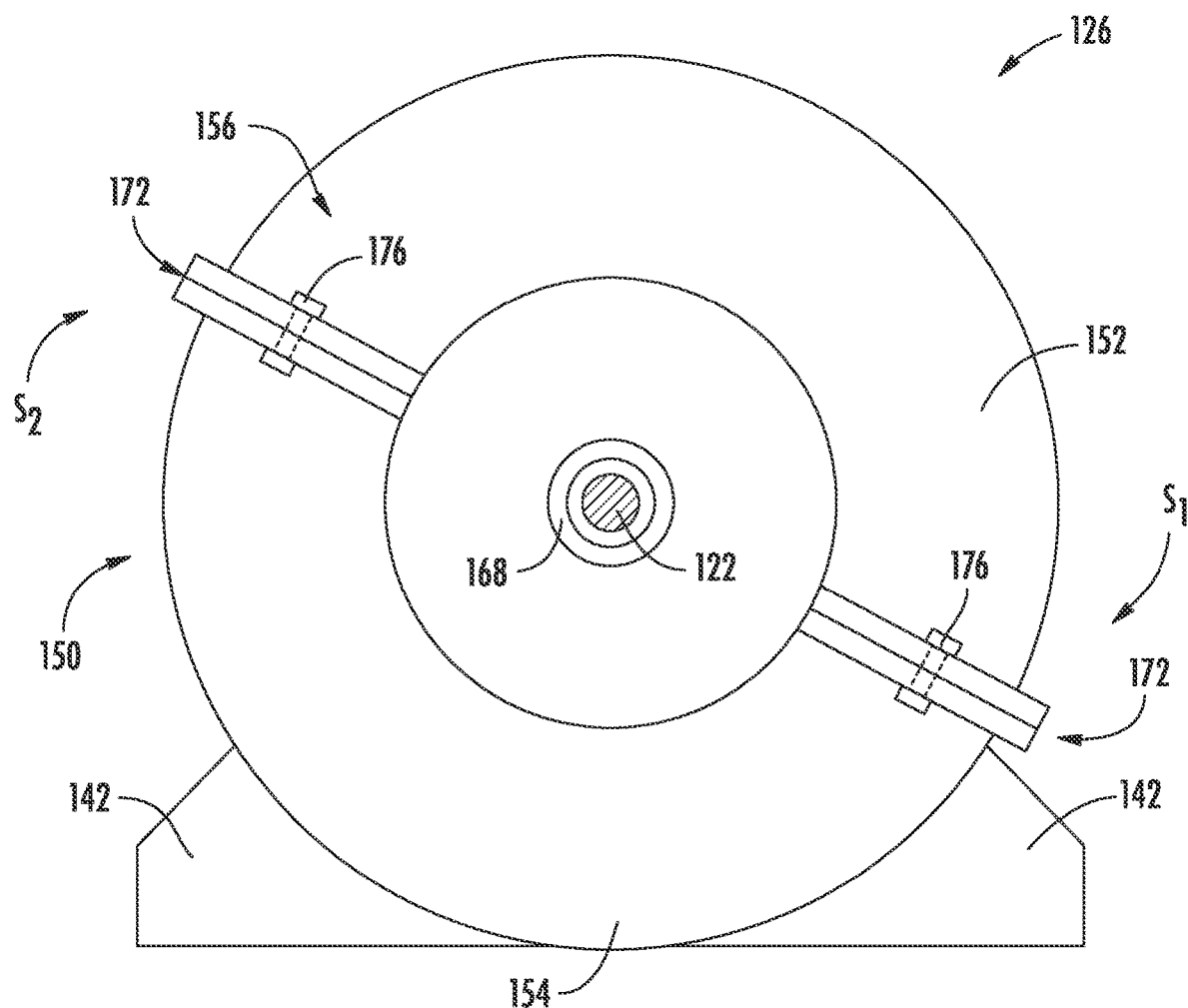
FIG. 3 illustrates a simplified front view of a gearbox of a wind turbine particularly the illustrating a first portion and a second portion according to aspects of the present disclosure.
Figure 5:
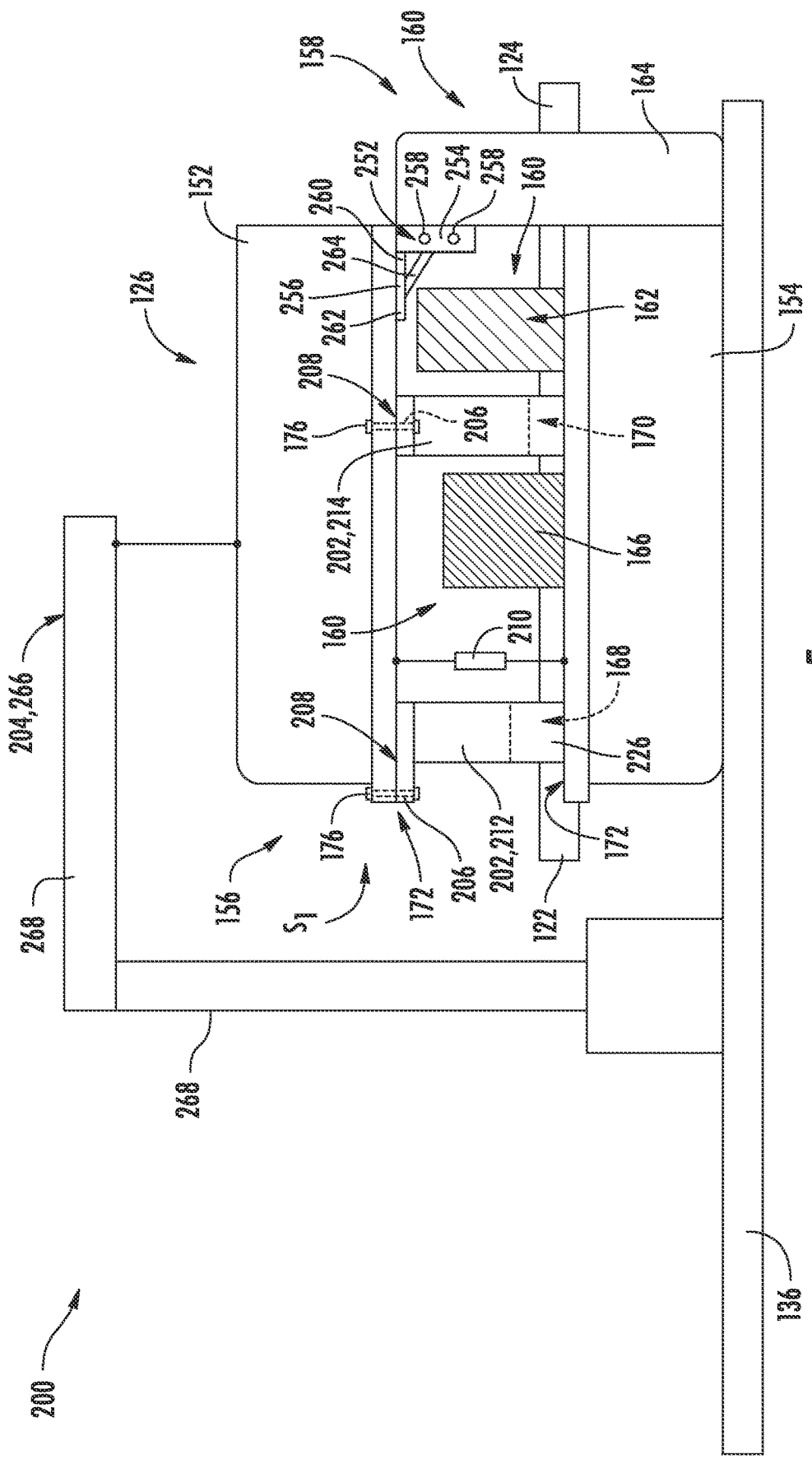
FIG. 5 illustrates a simplified side view of the gearbox of FIG. 3 in a repair configuration according to aspects of the present disclosure.

Referring now to FIGS. 3 and 5, a simplified front view of an assembled gearbox 126 for the wind turbine 100 and a simplified side view of the gearbox 126 in a repair configuration, in accordance with aspects of the present disclosure, are presented. As shown, the gearbox 126 may include a gearbox housing 150. The gearbox 126 may have a windward end 156 and a leeward end 158. The gearbox housing 150 may include at least a first portion 152 and a second portion 154. The gearbox housing 150 may enclose a gear assembly 160. As the rotor shaft 122 rotates, the gear assembly 160 converts the low speed, high torque input of the rotor shaft 122 to a high speed, low torque output of the generator shaft 124 and, thus, the generator 118.

The gear assembly 160 may be any suitable gear assembly that uses one or more gears and/or gear trains to provide speed and/or torque conversions from the rotor shaft 122 to the generator shaft 124. For example, in certain embodiments, the gear assembly 160 may include a planet gear set 162 having one or more outer or planet gears revolving around a central or sun gear. The planet gears may be mounted on a movable arm or carrier, which itself may rotate relative to the sun gear. The gear assembly 160 may include a ring gear 164, which may be formed as a component of the gearbox housing 150. The gearbox assembly 160 may also include a bull gear 166, which may extract a portion of torque from the gearbox 126 so as to drive additional components of the wind turbine 100. In at least one embodiment, the bull gear may be located to windward of the planet gear set 162. Additionally, the gear assembly 160 may include at least a first gearbox bearing 168 and a second gearbox bearing 170. The first gearbox bearing 168 and the second gearbox bearing 170 may have differing dimensions. For example, the first gearbox bearing 168 may have a first radius and the second gearbox bearing 170 may have a second radius. The second radius may be larger or smaller than the first radius.

In an embodiment in accordance with aspects of the present disclosure, the first portion 152 of the gearbox housing 150 may have a footprint with a width greater than 1 m, e.g., greater than or equal to 1.2 m. The width may be less than 2.5 meters, e.g., less than or equal to 1.5 m. The footprint may have a length greater than 2 m, e.g., greater than or equal to 2.4 m. The length may be less than 5 m, e.g., less than or equal to 3 m. The first portion 152 of the gearbox housing 150 have a weight greater than or equal to 900 kg, e.g. greater than or equal to 1,800 kg. The first portion 152 may have a weight less than 3,500 kg, e.g., less than or equal to 2,000 kg.

Figure 4:
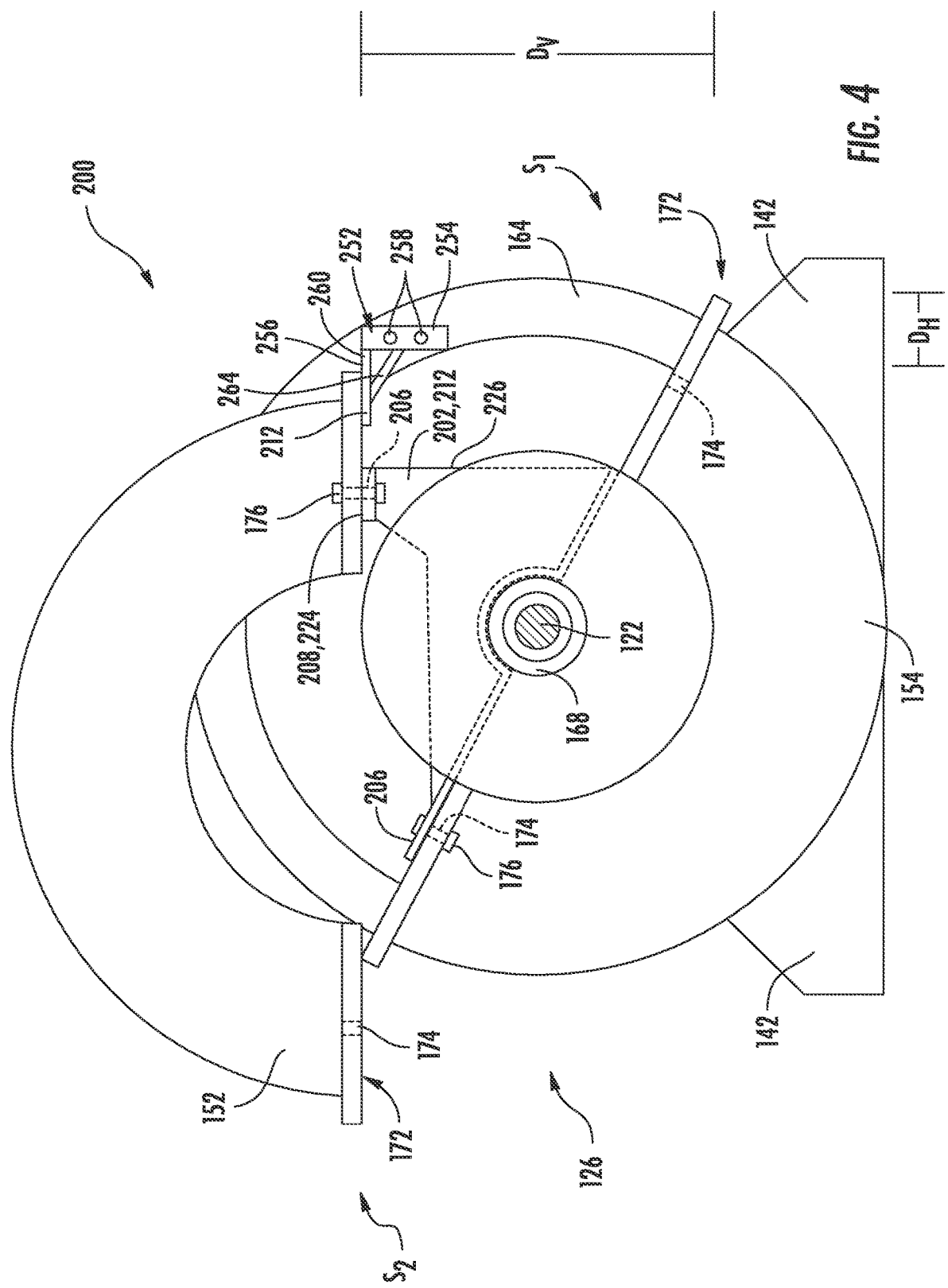
FIG. 4 illustrates a simplified front view of the gearbox of FIG. 3 in a repair configuration according to aspects of the present disclosure.

Referring to FIGS. 3-5, the first portion 152 of the gearbox housing 150 may be arranged atop the second portion 154 of the gearbox housing 150. The first portion 152 may contact the second portion 154 along a coupling interface 172. The coupling interface 172 may, in an embodiment, be a flanged-interface, which may define a plurality of fastener openings 174 for coupling the first and second portions 152, 154 with a plurality of fasteners 176. Alternatively, the first portion 152 may be formed so as to receive the second portion 154. For example, the coupling interface 172 may resemble a box with a lid.

In an embodiment, the coupling interface may be parallel to a horizontal plane. Alternatively, the coupling interface may deviate from the horizontal plane. For example, the first portion 152 may have a first side ($S_1$) and a second side ($S_2$). In an embodiment, the first side ($S_1$) may be positioned low the horizontal plane, while the second side ($S_2$) may be positioned above the horizontal plane when the gearbox housing 150 is in an assembled configuration, such as shown in FIG. 3. Alternatively, in an embodiment, the first portion 152 may be defined by the second portion 154 such that the first portion 152 is a gearbox hatch cover.

Referring now to FIG. 4, a simplified front view of portions of the repair system 200 installed in the gearbox 126 are depicted. In FIG. 4, the gearbox 126 is illustrated in a repair configuration according to aspects of the present disclosure. As depicted in FIG. 4, the first portion 152 of the gearbox housing 150 may be displaced or offset from the second portion 154 of the gearbox housing 150 when the gearbox housing 150 is in the repair configuration. In an embodiment, the first side ($S_1$) may, for example, be displaced vertically away from the second portion 154 to establish a vertical displacement ($D_V$). The displacement of, the first side ($S_1$) may occur while the second side ($S_2$) remains in contact with the second portion 154. In other words, the first portion 152 may exhibit a "clamshell" opening as the first portion 152 pivots at the point of interface between the second side ($S_2$) and the second portion 154. It should be appreciated that, in an alternative embodiment, both the first side ($S_1$) and the second side ($S_2$) may be displaced vertically with respect to the second portion 154.

Referring still to FIG. 4, the first portion 152 of the gearbox housing 150 may be displaced horizontally with respect to the second portion 154 of the gearbox housing 150, so as to establish a horizontal displacement ($D_H$). In an embodiment, the first portion 152 may be offset from the second portion 154 by establishing both the vertical displacement ($D_V$) and the horizontal displacement ($D_H$) of the first side ($S_1$) with respect to the second portion 154. It should be appreciated that, establishing the vertical displacement ($D_V$) and the horizontal displacement ($D_H$) of the first portion 152 of the gearbox housing 150 may also establish a gear removal path along which a portion of the gear assembly 160 may be hoisted from the gearbox 126. It should be further appreciated, that, in alternative embodiments in accordance with aspects of the present disclosure, the first portion 152 may be offset from the second portion 154 in only a vertical or a horizontal dimension.

Referring to FIGS. 4 and 5, the repair system 200 may include at least one gearbox housing support member 202 adapted for mounting to the second portion 154 of the gearbox housing 150 so as to provide a support surface for the first portion 152 of the gearbox housing 150. For example, the gearbox housing support member(s) 202 may, in an embodiment, be positioned beneath the first portion 152 while the first portion 152 is suspended by a lifting apparatus 204. The gearbox housing support member(s) 202 may define a mounting hole 206 positioned to align with a corresponding fastener opening 174 of the second portion 154 of the gearbox housing 150. A fastener 176 may be inserted through the mounting hole 206 to secure the gearbox housing support member(s) 202 to the second portion 154. The gearbox housing support member(s) 202 may include a support surface 208. The support surface 208 may support the first portion 152. In an embodiment, the support surface 208 may be positioned to support the first side ($S_1$) while the second side ($S_2$) is supported by contact with the second portion 154. The support surface 208 may be formed so as to orient the first portion 152 in the offset position discussed above. The support surface 208 may define an additional mounting hole 206 so as to facilitate the coupling the first portion 152 to the gearbox housing support member(s) 202 with a fastener. The gearbox housing support member(s) 202 may have a maximum dimension less than a dimension of an access hatch of the wind turbine 100 so as to facilitate the lifting of the gearbox housing support member(s) 202 through the access hatch of the wind turbine.

Referring still to FIG. 5, the repair system 200 may also include a mechanical device 210 coupled between the first and second portions 152, 154 of the gearbox housing 150. The mechanical device 210 may be positioned to increase a downward force exerted by the first portion 152 of the gearbox housing 150 on the gearbox housing support member(s) 202. The downward force may serve to secure the first portion 152 to the second portion 154 through the gearbox housing support member(s) 202. The mechanical device 210 may be any suitable device configured to increase the downward force of the first portion 152. For example, the mechanical device 210 may be a winch, a turnbuckle, or a cable puller. It should be appreciated that the mechanical device 210 may be employed alone or in conjunction with the fastener 176 coupling the first portion 152 to the gearbox housing support member(s) 202.

Referring still to FIG. 5, in an embodiment, the gearbox housing support member(s) 202 may include a first gearbox housing support member 212 and a second gearbox housing support member 214. The first gearbox housing support member 212 may be positioned adjacent to the windward end 156 of the gearbox 126. The first gearbox housing support member 212 may be supported by the first gearbox bearing 168. The second gearbox housing support member 214 may be positioned between the bull gear 166 and the planet gear set 162. The second gearbox housing support member 214 may be supported by the second gearbox bearing 170. It should be appreciated that the present disclosure is not limited to two gearbox housing support members 202 but may include any number of gearbox housing support members 202 that may be required to safely and securely support the first portion 152 of the gearbox housing 150 in an offset position or orientation.

Figure 6:
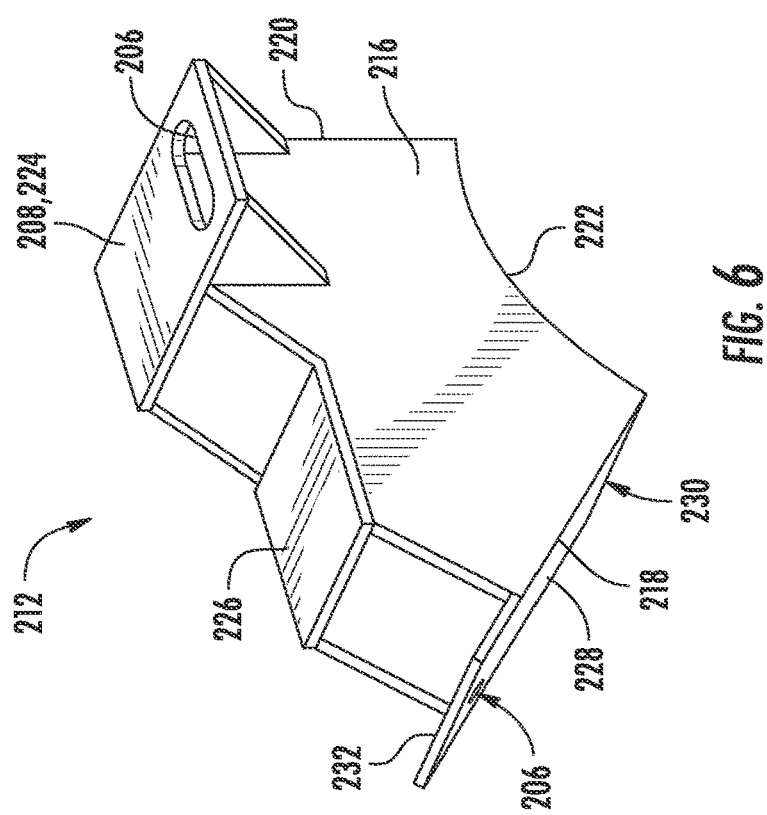
FIG. 6 illustrates a perspective view of an embodiment of a gearbox housing support member, particularly illustrating a first gearbox housing support member according to aspects of the present disclosure.

Referring to FIG. 6, a perspective view of the first gearbox housing support member 212, in accordance with aspects of the present disclosure, is presented. The first gearbox housing support member 212 may include a pair of vertical sides 216. Each of the vertical sides 216 may have an angled edge 218. Each of the vertical sides 216 may have a vertical edge 220 opposite the angled edge 218. The vertical edge 220 may define the vertical displacement ($D_V$). Each of the vertical sides 216 may have a bearing edge 222. The bearing edge 222 may be adapted to receive and contact the first gearbox bearing 168. The bearing edge 222 may have a radius which is more than one millimeter (mm) and less than 20 mm larger than the radius of the first gearbox bearing 168.

Still referring to FIG. 6, the first gearbox housing support member 212 may have a first support surface 224. The first support surface 224 may be coupled to the pair of vertical sides 216 opposite the bearing edge 222. The first support surface 224 may have a longitudinal axis parallel with an axial centerline of the gearbox 126. A portion of the first support surface 124 may extend outward of one of the pair of vertical sides 216. The portion of the first support surface 124 extending outward of the vertical sides 216 may define a mounting hole 206 positioned to align with a corresponding feature of the first portion 152 of the gearbox housing 150.

Still referring to FIG. 6, the first gearbox housing support member 212 may have at least one horizontal reinforcing web 226 disposed between the pair of vertical sides 216. The first gearbox housing support member 212 may also have a first mounting plate 228 disposed between the pair of vertical sides 216 along the angled edge 218. The first mounting plate 228 may have a first mounting plate first end 230 adjacent to the bearing edge 222 and a second end 232 extending beyond the pair of vertical sides 216. The second end 232 may define a mounting hole positioned to align with the corresponding feature of the second portion 154 of the gearbox housing 150.

Figure 7:
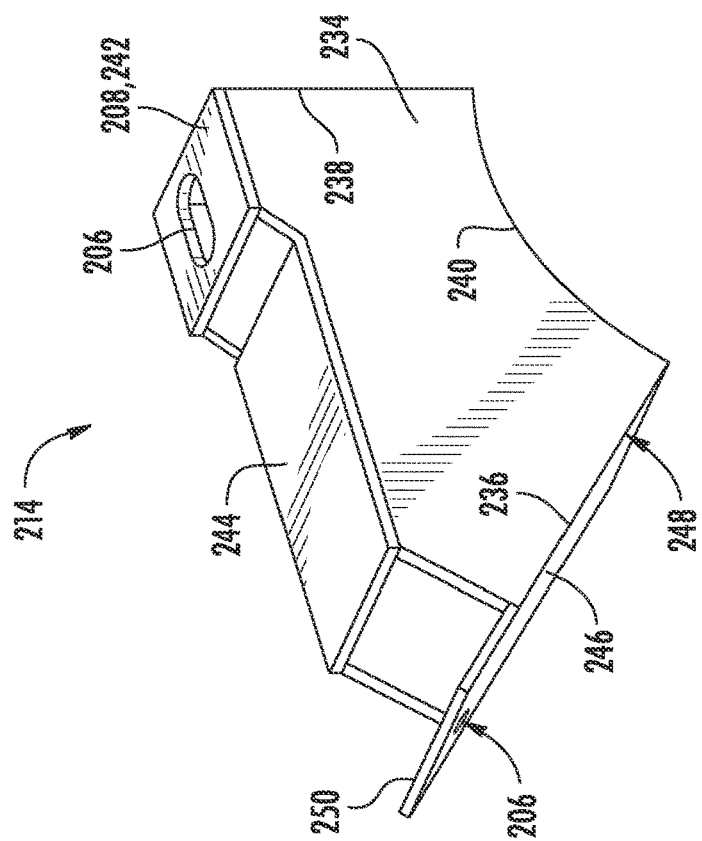
FIG. 7 illustrates a perspective view of an embodiment of a gearbox housing support member, particularly illustrating a second gearbox housing support member according to aspects of the present disclosure.

Referring to FIG. 7, a perspective view of the second gearbox housing support member 214, in accordance with aspects of the present disclosure, is presented. The second gearbox housing support member 214 may include a pair of vertical sides 234. Each of the vertical sides 234 may have an angled edge 236. Each of the vertical sides 234 may have a vertical edge 238 opposite the angled edge 236. The vertical edge 238 may define the vertical displacement ($D_V$). Each of the vertical sides 234 may have a bearing edge 240. The bearing edge 240 may be adapted to receive and contact the second gearbox bearing 170. The bearing edge 240 may have a radius which is more than 1 mm and less than 20 mm larger than the radius of the second gearbox bearing 170.

Still referring to FIG. 7, the second gearbox housing support member 214 may have a second support surface 242. The second support surface 242 may be coupled to the pair of vertical sides 234 opposite the bearing edge 240. The second support surface 242 may have a longitudinal axis parallel with the pair of vertical sides 234 and perpendicular to the axial centerline of the gearbox 126.

Still referring to FIG. 7, the second gearbox housing support member 214 may have at least one horizontal reinforcing web 244 disposed between the pair of vertical sides 234. The second gearbox housing support member 214 may also have a second mounting plate 246 disposed between the pair of vertical sides to hunt 34 along the angled edge 240. The second mounting plate 246 may have a second mounting plate first end 248 adjacent to the bearing edge 240 and a second end 250 extending beyond the pair of vertical sides 234. The second end 250 may define a mounting hole positioned to align with the corresponding feature of the second portion 154 of the gearbox housing 150.

Referring again to FIGS. 4 and 5, the repair system 200 may include a safety support 252. The safety support 252 may be coupled to the ring gear 164 of the gearbox 126. In an embodiment, the safety support 252 may be coupled to the ring gear 164 on the side of the gearbox 126 where the maintenance or repair operation may occur. The safety support 252 may include a mounting bracket 254 and a force arm 256. The mounting bracket 254 may define a plurality of fastener openings 258 for coupling the safety support 252 to the ring gear 164. The force arm 256 may include a first end 260 and a second end 262. The first end 260 may be adapted for perpendicularly coupling to the mounting bracket 254. The second end 262 may be adapted for positioning below the first portion 152 of the gearbox housing 150. The safety support 252 may include a reinforcing member 264 coupled between the force arm 256 and the mounting bracket 254.

The force arm 256 may be adapted so as to impart a moment on the first portion 152 during an unplanned descent of the first portion 152. For example, since the safety support 252 may be positioned on the same side of the gearbox as a technician performing the maintenance or repair operation, the safety support 252 may, in the event the first portion 152 begins to fall, prevent the first portion 152 from falling on the technician. Instead, the moment imparted by the safety support 252 may cause the first portion 152 to fall toward the opposite side of the gearbox 126.

Referring again to FIG. 5, the repair system 200 may include the lifting apparatus 204. The lifting apparatus 204 may be adapted for lifting the first portion 152 of the gearbox housing 150 relative to the second portion 154 of the gearbox housing 150. The lifting apparatus 204 may be an uptower crane 266, which may be a boom crane. The lifting apparatus 204 may be configured to be temporarily secured to a component of the wind turbine 100, such as the torque arm 142. The lifting apparatus 204 may have a maximum dimension less than a dimension of the access hatch to the wind turbine 100. The lifting apparatus 204 may have a lifting footprint defined by the hatch through which the lifting apparatus 204 must be hoisted. For example, in an embodiment, the access hatch to the wind turbine 100 may have a maximal dimension, such as a length, a width, or a diameter, of 100 centimeters. In such an embodiment, the lifting apparatus 204 may be configured to pass through the access hatch and be mounted to a component of the wind turbine 100.

It should be appreciated that, in an embodiment, the lifting apparatus 204 may include a plurality of segments 268. In such an embodiment, each segment of the plurality of segments 268 may have a maximum dimension less than a dimension of the access hatch of the wind turbine 100. The plurality of segments 268 may be assembled uptower so as to assemble the lifting apparatus 204. It should be further appreciated that in such an embodiment, the maximum dimension of the assembled lifting apparatus 204, such as the uptown crane 266, may exceed the dimension of the access hatch to the wind turbine 100.

Figure 8:
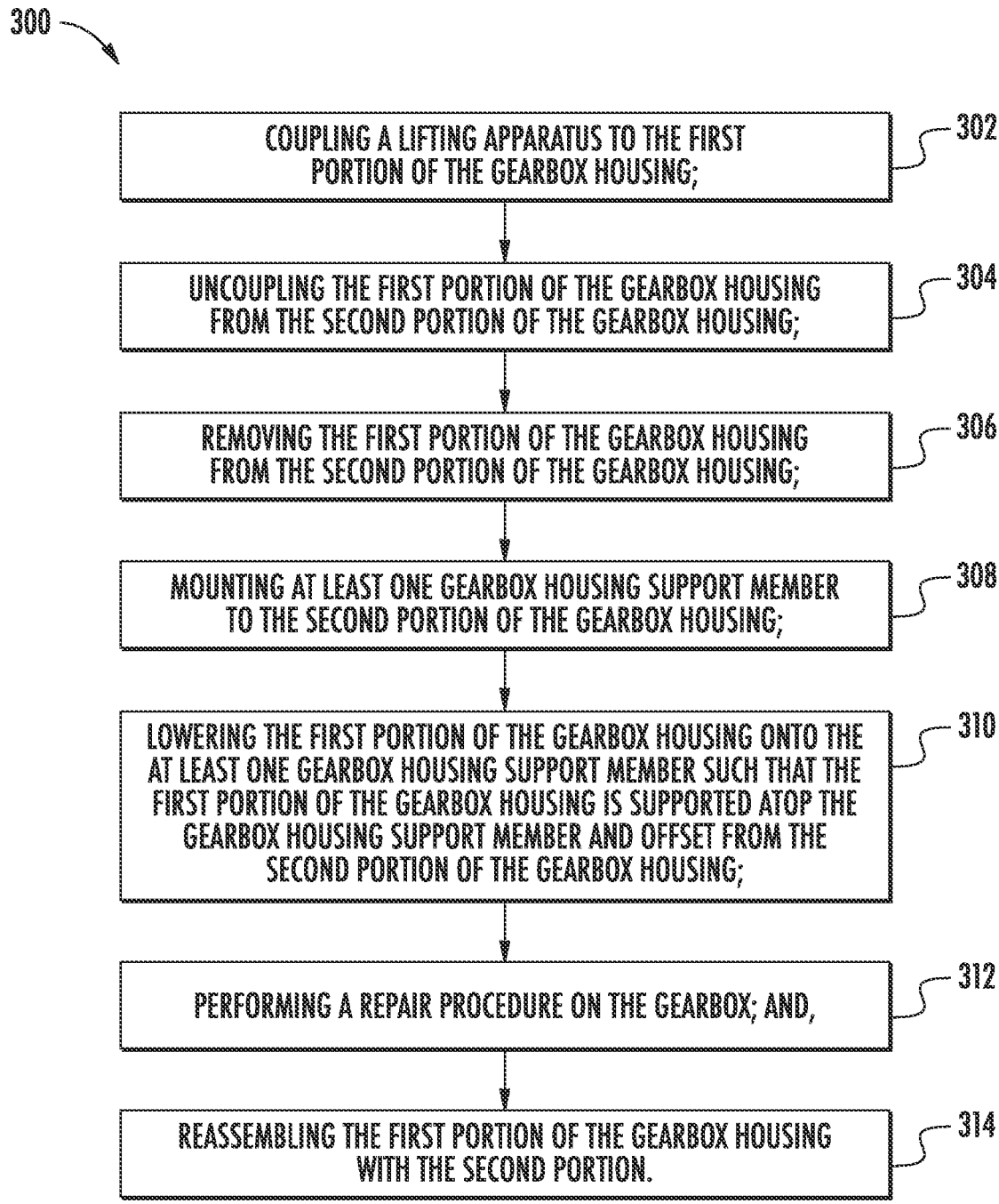
FIG. 8 illustrates a flow diagram of one embodiment of a method for repairing a gearbox of a wind turbine uptower according to aspects of the present disclosure.

Referring to FIG. 8, a flow diagram of one embodiment of a method 300 for performing a maintenance and/or repair procedure on a component of a wind turbine is illustrated. The method 300 may be implemented using, for instance, the repair system 200 discussed above with reference to FIGS. 4-7. FIG. 8 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously or modified in various ways without deviating from the scope of the present disclosure.

As shown at (302), the method 300 includes coupling a lifting apparatus to the first portion of the gearbox housing. As shown at (304), the method 300 includes uncoupling the first portion of the gearbox housing from the second portion of the gearbox housing. As shown at (306), the method 300 includes removing the first portion of the gearbox housing from the second portion of the gearbox housing. As shown at (308), the method 300 includes mounting at least one gearbox housing support member to the second portion of the gearbox housing. As shown at (310), the method 300 includes lowering the first portion of the gearbox housing onto the at least one gearbox housing support member such that the first portion of the gearbox housing is supported atop the gearbox housing support member and offset from the second portion of the gearbox housing. As shown at (312), the method 300 includes performing a repair procedure on the gearbox. Additionally, as shown at (314), the method 300 includes reassembling the first portion of the gearbox housing with the second portion.

In additional embodiments, the method 300 may also, in accordance with the disclosures above, include mounting the first gearbox housing support member to the second portion of the gearbox housing adjacent to a windward end of the gearbox, and mounting the second gearbox housing support member to the second portion of the gearbox housing between a bull gear and a planet gear of the gearbox. In another embodiment, the mounting the first and second gearbox support members may include positioning a first gearbox support member radius on a first gearbox bearing so as to support the first gearbox support member and positioning a second gearbox support member radius on a second gearbox bearing so as to support the second gearbox member.

In additional embodiments, the method 300 may include positioning a safety support below the first portion of the gearbox housing opposite the at least one gearbox housing support member as the first portion of the gearbox housing is being supported by the at least one gearbox housing support member, and coupling the safety support to a ring gear of the gearbox. In yet another embodiment, the method 300 may include securing the first portion of the gearbox housing to the at least one gearbox housing support member via one or more fasteners secured within corresponding holes of the first portion of the gearbox housing and the at least one gearbox housing support member.

In still further embodiments, the method 300 may include applying a downward pressure to the first portion of the gearbox housing so as to increase a downward force exerted by the first portion of the gearbox housing on the at least one gearbox housing support member. In an additional embodiment, the hoisting the first portion of the gearbox housing away from the second portion of the gearbox housing may include establishing a horizontal displacement and a vertical displacement of the first portion of the gearbox housing so as to establish a gear removal path.

In yet further embodiments, the method 300 may include hoisting the at least one gearbox housing support member and the lifting apparatus uptown or through an opening defined by hatch of a nacelle of the wind turbine. In an additional embodiment, the method 300 may include hoisting a crane uptower and through the hatch and lifting, via the crane the at least one gearbox housing support member uptower. In an additional embodiment, the method 300 may include hoisting the crane uptower in segments and assembling the segments uptower so as to assemble the crane.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A repair system for repairing a gearbox of a wind turbine uptower, the gearbox having a gearbox housing formed, at least, of a first portion and a second portion, the repair system comprising:
  a lifting apparatus for removably coupling to the first portion of the gearbox housing of the gearbox, the lifting apparatus adapted for lifting the first portion of the gearbox housing relative to the second portion of the gearbox housing; and,
  at least one gearbox housing support member adapted for mounting to the second portion of the gearbox housing so as to provide a support surface for the first portion of the gearbox housing, during a repair procedure of the gearbox, that is offset from the second portion.

Clause 2. The repair system of claim 1, further comprising a safety support coupled to a ring gear of the gearbox, the safety support being oriented so as to divert a first portion of the gearbox during an unplanned descent.

Clause 3. The repair system of clause 2, wherein the safety support further comprises a mounting bracket and a force arm, the mounting bracket defining a plurality of fastener openings for coupling to the ring gear, the force arm comprising a first end and a second end, the first end adapted for perpendicularly coupling to the mounting bracket, the second end for positioning below the first portion of the gearbox housing.

Clause 4. The repair system of clause 3, wherein the safety support further comprises a reinforcing member coupled between the force arm and the mounting bracket, wherein the force arm is adapted so as to impart a moment on the first portion of the gearbox housing during an unplanned descent of the first portion of the gearbox housing.

Clause 5. The repair system of claim 1, wherein the at least one gearbox housing support member further comprises, at least, a first gearbox housing support member and a second gearbox housing support member, the first gearbox housing support member for positioning between the first portion and the second portion of the gearbox housing adjacent to a windward end of the gearbox, the second gearbox housing support member for positioning between the first portion and the second portion of the gearbox housing.

Clause 6. The repair system of clause 5, wherein the first and second gearbox housing supports comprise first and second support contact regions each defining first and second radii, respectively, the first and second radii adapted to receive and contact different bearings of the gearbox, the first and second gearbox housing supports further comprising first and second support surfaces.

Clause 7. The repair system of clause 6, wherein the first support surface has a longitudinal axis parallel with an axial centerline of the gearbox, and wherein the second support surface has a longitudinal axis perpendicular to an axial centerline of the gearbox.

Clause 8. The repair system of clause 1, further comprising:
a mechanical device for coupling between the first portion of the gearbox housing and the second portion of the gearbox housing so as to increase a downward force exerted by the first portion of the gearbox housing on the at least one gearbox housing support member.

Clause 9. The repair system of clause 1, wherein the lifting apparatus further comprises an uptower crane, the uptower crane comprising a maximum dimension less than a dimension of an access hatch to the wind turbine.

Clause 10. A method for repairing a gearbox of a wind turbine uptower, the gearbox having a gearbox housing with a first portion arranged atop a second portion, the method comprising:
coupling a lifting apparatus to the first portion of the gearbox housing;
uncoupling the first portion of the gearbox housing from the second portion of the gearbox housing;
removing the first portion of the gearbox housing from the second portion of the gearbox housing;
mounting at least one gearbox housing support member to the second portion of the gearbox housing;
lowering the first portion of the gearbox housing onto the at least one gearbox housing support member such that the first portion of the gearbox housing is supported atop the gearbox housing support member and offset from the second portion of the gearbox housing;
performing a repair procedure on the gearbox; and,
reassembling the first portion of the gearbox housing with the second portion.

Clause 11. The method of clause 10, wherein the at least one gearbox housing support member comprises, at least, a first gearbox housing support member and a second gearbox housing support member, the method further comprising:

mounting the first gearbox housing support member to the second portion of the gearbox housing adjacent to a windward end of the gearbox; and,
mounting the second gearbox housing support member to the second portion of the gearbox housing between a bull gear and a planet gear of the gearbox.

Clause 12. The method of clause 11, wherein the mounting the first gearbox support member further comprises positioning a first gearbox support member radius on a first gearbox bearing so as to support the first gearbox support member, and wherein the mounting the second gearbox support member further comprises positioning a second gearbox support member radius on a second gearbox bearing so as to support the second gearbox support member.

Clause 13. The method of clause 10, further comprising:
positioning a safety support below the first portion of the gearbox housing opposite the at least one gearbox housing support member as the first portion of the gearbox housing is being supported by the at least one gearbox housing support member; and,
coupling the safety support to a ring gear of the gearbox.

Clause 14. The method of clause 10, further comprising:
securing the first portion of the gearbox housing to the at least one gearbox housing support member via one or more fasteners secured within corresponding holes of the first portion of the gearbox housing and the at least one gearbox housing support member.

Clause 15. The method of clause 10, further comprising:
applying a downward pressure to the first portion of the gearbox housing so as to increase a downward force exerted by the first portion of the gearbox housing on the at least one gearbox housing support member.

Clause 16. The method of clause 10, wherein hoisting the first portion of the gearbox housing away from the second portion of the gearbox housing further comprises establishing a horizontal displacement and a vertical displacement of the first portion of the gearbox housing so as to establish a gear removal path.

Clause 17. The method of clause 10, further comprising:
hoisting the at least one gearbox housing support member and the lifting apparatus uptower through an opening defined by a hatch of a nacelle of the wind turbine.

Clause 18. The method of clause 17, further comprising:
hoisting a crane uptower and through the hatch; and
lifting, via the crane, the at least one gearbox housing support member uptower.

Clause 19. The method of clause 18, further comprising:
hoisting the crane uptower in segments; and,
assembling the segments uptower so as to assemble the crane.

What is claimed is:

1. A repair system for repairing a gearbox of a wind turbine uptower, the gearbox having a gearbox housing formed, at least, of a first portion and a second portion, the repair system comprising:
a lifting apparatus for removably coupling to the first portion of the gearbox housing of the gearbox, the lifting apparatus adapted for lifting the first portion of the gearbox housing relative to the second portion of the gearbox housing;
at least one gearbox housing support member adapted for mounting to the second portion of the gearbox housing so as to provide a support surface for the first portion of the gearbox housing, during a repair procedure of the gearbox, that is offset from the second portion; and
a safety support coupled to a ring gear of the gearbox, the safety support being oriented so as to divert the first portion of the gearbox during an unplanned descent, wherein the safety support comprises a mounting bracket and a force arm, the mounting bracket defining a plurality of fastener openings for coupling to the ring gear, the force arm comprising a first end and a second end, the first end adapted for perpendicularly coupling to the mounting bracket, the second end adapted for positioning below the first portion of the gearbox housing.

2. The repair system of claim 1, wherein the at least one gearbox housing support member further comprises, at least, a first gearbox housing support member and a second gearbox housing support member, the first gearbox housing support member for positioning between the first portion and the second portion of the gearbox housing adjacent to a windward end of the gearbox, the second gearbox housing support member for positioning between the first portion and the second portion of the gearbox housing.

3. The repair system of claim 2, wherein the first and second gearbox housing supports comprise first and second support contact regions each defining first and second radii, respectively, the first and second radii adapted to receive and contact different bearings of the gearbox, the first and second gearbox housing supports further comprising first and second support surfaces.

4. The repair system of claim 3, wherein the first support surface has a longitudinal axis parallel with an axial centerline of the gearbox, and wherein the second support surface has a longitudinal axis perpendicular to the axial centerline of the gearbox.

5. The repair system of claim 1, wherein the safety support further comprises a reinforcing member coupled between the force arm and the mounting bracket, wherein the force arm is adapted so as to impart a moment on the first portion of the gearbox housing during an unplanned descent of the first portion of the gearbox housing.

6. The repair system of claim 1, further comprising:

a mechanical device for coupling between the first portion of the gearbox housing and the second portion of the gearbox housing so as to increase a downward force exerted by the first portion of the gearbox housing on the at least one gearbox housing support member.

7. The repair system of claim 1, wherein the lifting apparatus further comprises an uptower crane, the uptower crane comprising a maximum dimension less than a dimension of an access hatch to the wind turbine.

* * * * *